United States Patent [19]

Ellis

[11] 4,439,483
[45] * Mar. 27, 1984

[54] SPRAY-SUPPRESSION DEVICE

[75] Inventor: Earle R. Ellis, Pensacola, Fla.

[73] Assignee: Monsanto Company, St. Louis, Mo.

[ * ] Notice: The portion of the term of this patent subsequent to Jul. 5, 2000 has been disclaimed.

[21] Appl. No.: 492,528

[22] Filed: May 9, 1983

Related U.S. Application Data

[62] Division of Ser. No. 365,342, Apr. 5, 1982, Pat. No. 4,391,870.

[51] Int. Cl.³ .............................................. B32B 7/02
[52] U.S. Cl. .................................... 428/287; 156/313; 428/284; 428/286; 428/296
[58] Field of Search ............... 428/218, 284, 286, 296, 428/287; 156/313

[56] References Cited

U.S. PATENT DOCUMENTS

| | | | |
|---|---|---|---|
| 3,423,231 | 1/1969 | Lutzman | 117/68.5 |
| 3,697,368 | 10/1972 | Bhuta et al. | 161/227 |
| 4,329,196 | 5/1982 | Rawlinson | 156/243 |
| 4,391,870 | 7/1983 | Ellis | 428/284 |

*Primary Examiner*—James J. Bell
*Attorney, Agent, or Firm*—Thomas E. Kelley; Arthur E. Hoffman

[57] ABSTRACT

A laminated, spray-suppression device having service properties over a wide range of use temperatures includes a non-woven nylon fabric core layer to inhibit stress cracks originating at low temperatures in an embrittled, grass-like low density polyethylene or polypropylene layer on one side of the core layer from propagating through to a high density polyethylene backing layer on the other side of the core layer.

9 Claims, No Drawings

SPRAY-SUPPRESSION DEVICE

This is a division, of application Ser. No. 365,342 filed Apr. 5, 1982, now U.S. Pat. No. 4,391,870.

BACKGROUND OF THE INVENTION

This invention relates to a laminate and more particularly to a strongly bonded, multi-layered spray-suppression device having a balance of service properties enabling its use over a broad range of climatic conditions.

As disclosed in U.S. Pat. No. 3,899,192, laminated spray-suppression devices for mounting adjacent wheels of moving vehicles are known in the prior art. In such patent a grass-like layer is shown facing the rotating wheel and this has proven especially effective in absorbing impinging spray from a wet roadway surface and allowing it to drain pack onto the pavement.

As disclose U.S. Pat. No. 4,361,606, a performance problem has occurred with such devices when formed of integrally fused low density polyethylene and high density polyethylene layers. More specifically, cracks generated in the grass-like layer of low density polyethylene which has a pronounced tendency to embrittle at temperatures on the order of about minus 20° F. (minus 29° C.) propagate through to the high density polyethylene backing layer. This results in fracture of the laminate through its entire thickness even though the relatively good low temperature ductility of the high density polyethylene would be expected to be adequate to inhibit the crack from perpetrating through such high density polyethylene layer. As disclosed in such application, irradiation of the composite overcomes the problem and provides the device with the desired balance of low temperature properties.

However, though irradition has been used it has deficiencies. More specifically, rather high dosages are necessary to alleviate cracking and this represents significant expense. Moreover such dose levels provide an undesirable yellow tinge to the laminated product. In addition, catalyst residues and various processing additives present in the polyethylene of the various layers may be activated by the irradiation and react over long term periods to cause deterioration in the very properties intended to be enhanced.

SUMMARY OF THE INVENTION

Now, however, a laminated spray-suppression device has been developed which overcomes the aforementioned deficiencies of the prior art.

Accordingly, it is a principal object of this invention to provide a laminated spray-suppression device having a decreased tendency to crack through its thickness at low temperatures which does not rely on irradiation for its effectiveness.

Another object of this invention is to provide such a device which achieves low temperature effectiveness via incorporation into the laminate of a low cost, intervening core layer which acts as a barrier to propagation of the crack from one outer layer to the other.

These and other objects of the invention are accomplished by the provision of a laminated, spray-suppression device comprising a non-woven polyamide fabric core layer encapsulated on each side with an adhesive layer, a backing layer of high density polyethylene fusion-bonded to one of the adhesive layers and a grass-like, three-dimensional layer of low density polyethylene or polypropylene fusion-bonded to the other adhesive layer.

PREFERRED EMBODIMENTS

The present invention is directed toward improving the low temperature performance of strongly bonded spray-suppression laminates without sacrificing the capability of such laminates to perform satisfactorily at ambient temperatures of up to about 140° F. The laminates of the invention have at least one outer, grass-like, three-dimensional layer of low density polyethylene having a density of from 0.910 to 0.925 gr./cc. or polypropylene which inherently has poor low temperature ductility, an opposite backing layer of high density polyethylene for structural support, each of such layers being fusion-bonded on their inner faces to a thermoplastic adhesive layer. Such adhesive layers in the invention encapsulate a crack-propagation-inhibiting central core layer in a manner to be further described. Additional layers of other materials may be included if desired. The three-dimensional grass-like layer is preferably made in accordance with the teaching of U.S. Pat. Nos. 3,507,010 and 3,590,109 which are incorporated herein by reference. The application of such a spray-suppression laminate is in the form of a rain flap for reducing splash and spray thrown from the wheel of a moving vehicle is described in U.S. Pat. No. 3,899,192, which is also incorporated herein by reference.

The splash and spray-reducing rain flap devices of the invention are typically mounted as conventional mud flaps with the grass-like layer facing a vehicle wheel. In this arrangement, the rain flap is rigidly secured along its upper edge to a portion of the vehicle body rearward of the vehicle wheel and the flap is free to flex around these securement points even though the high density polyethylene backing layer facing away from the wheel imparts substantial stiffness or rigidity to the composite. During vehicle travel the spray-reducing rain flap composite is submitted to continual flexure conditions due primarily to wind pressure from the forward movement of the vehicle. In normal operation this wind pressure results in flexure of the composite rain flap such that the grass-like layer is in tension whereas the backing layer is in compression.

The properties of both high density and low density polyethylene or polypropylene are such that the composite rain flap has acceptable mechanical strength properties over most driving temperature conditions. During winter months, however, the temperatures to which these devices are exposed may fall well below 0° F. (minus 18° C.). While the high density substrate layer per se has low temperature ductility properties such that a unitary article of this material would remain ductile at temperatures down to at least below minus 30° F. (minus 34° C.), a laminate of this substrate melt bonded to a three-dimensional low density polyethylene or polypropylene layer exhibits significant failures at temperatures below about 0° F. (minus 18° C.).

The structure of the prior art three-dimensional laminate of grass-like low density polyethylene directly bonded to a high density polyethylene backing contributes to the failure occurrence problem to which the present invention is directed toward overcoming. More specifically, and as disclosed in U.S. Pat. No. 3,899,192, the three-dimensional layer contains a base from which clusters of blade-like protrusions extend. This configuration presents a concentration of local high stress areas resulting from its geometry which serve as crack initiation points when the embrittled low density polyethylene or polypropylene layer is flexed at low temperatures. As a result of the intimate association of the two fusion-bonded layers, cracks resulting in fracture of the three-dimensional layer cross the indistinct boundary between the layers and initiate defects in the high density polyethylene backing layer. While the backing layer per se remains ductile at these low temperatures, the initiated defect may be propagated through the thickness of such backing layer to cause fracture of the entire laminate. Failure of this prior art rain flap composite in normal operation may occur at any point along the length of the rain flap. Since most rain flap applications will subject the device to low temperature conditions for at least part of the year, the problem of failure by this mode is significant.

The concept of the invention is to overcome such low temperature fracture problem without the use of radiation by instead incorporating a specially selected, intervening, crack-propagation-inhibiting layer between the outer high density and low density components while still retaining strong fusion-bonded joints between the layers. In this regard the core layer must be sufficiently soft and pliable (yet have sufficient structural integrity to hold together as to be handlable in a sheet forming process) as to be capable in functional position between the two outer layers of absorbing and dissipating the energy of a crack as it is transmitted in low temperature service to such core layer from the embrittled low density or polypropylene layer, thereby preventing the crack from propagating through to the high density layer, which if it occurred would result in fracture of the entire laminate. Considered differently, crack propagation to the high density polyethylene from the low density polyethylene or polypropylene in a laminate where all the layers are fusion-bonded cannot be achieved when a core layer is present which is formed of a thermoplastic selected for strength, since such a strong thermoplastic would serve as a carrier to transmit rather than absorb the crack-propagating energy from the embrittled material to the high density material.

The component of the invention fulfilling the foregoing core layer criteria is a non-woven synthetic plastic fabric preferably comprising a polyamide. Such polyamides include nylon 6 (polycaproamide); nylon 6,6 (polyhexamethylene adipamide); nylon 6,10; nylon 10; nylon 11 (poly-11-undecanoamide) and nylon 12 (poly-12-dodecanoamide) and the like. The preferred polyamides are nylon 6 and nylon 6,6 with the latter the most preferred. A suitable spunbonded nylon 6,6 web material is commercially available from Monsanto Company under the registered trademark Cerex at a nominal average basis weight of 1.50 ounces per square yard as measured by ASTM-1910-64. Such non-woven fabric materials are prepared by procedures well known to those skilled in the art which generally involve forming polyamide filaments in a multiplicity of spinnerettes followed by deposition on a moving surface and bonding at a multiplicity of cross-over points by mechanical, thermal or chemical means. For example, bonding may be achieved by spraying with hydrogen chloride to cause the filaments to become tacky and stick together after which the excess hydrogen chloride is washed off.

Since the polyamide material of the core layer will not fusion-bond to the polyethylene of the grass-like and backing layers it is necessary to use an adhesive layer affixed to either side of the core layer, which is compatible with and can be fusion-bonded to the polyethylene. Suitable adhesive compositions compatible with polyethylene and assumed compatible with polypropylene include thermoplastic adhesives such as copolymers of ethylene and vinyl acetate in proportions of from about 6 to about 30 weight percent vinyl acetate and from about 94 to about 70 weight percent ethylene; copolymers of ethylene and methyl or ethyl acrylate or methyl ethyl acrylate in proportions of about 20 to about 30 weight percent of the acrylate and about 80 to about 70 weight percent ethylene; copolymers of ethylene and isobutyl acrylate in proportions of about 20 to about 30 weight percent isobutyl acrylate and about 80 to about 70 weight percent ethylene. Blends of such adhesive compositions may also be employed. Preferred adhesive compositions are copolymers of ethylene and vinyl acetate containing 8 to 14 weight percent vinyl acetate chemically combined with 92 to 86 weight percent ethylene. A most preferred composition comprises 91 weight percent ethylene/9 weight percent vinyl acetate commercially available from U.S. Industrial Chemicals Co. under the trademark Ultrathene UE635.

In securing the adhesive layer to the non-woven core fabric it is important that the adhesive layer be applied in a controlled manner so as to penetrate and wet only a thin surface film (usually from about 0.020 to about 0.030 mm. or about 0.79 to about 1.18 mils) on each side of the fabric leaving the remaining thickness of the fabric layer unimpregnated and available to perform its energy-dissipating function of inhibiting crack propagation in the laminate. Stated differently, it is not the intent of the invention to provide an adhesive layer reinforced with the fibers of the non-woven material which would be the result if the fabric were fully impregnated with the adhesive, but rather to coat each side of such fabric with the adhesive composition such that the latter flows around the fibers of only a surface layer of the fabric which on setting results in the adhesive being mechanically bonded to such surface fibers providing in the combination an interim laminate available for fusion-bonding on each side to the outer polyethylene or polypropylene grass-like layer and high density polyethylene backing layer. In this regard the mass of the fabric is a factor with the minimum basis weight providing acceptable results at commercial coating rates being about 0.75 ounces per square yard (25.4 gms./m$^2$).

To prepare the spray-suppression laminates of the invention, a wide variety of manufacturing techniques may be utilized. For example, the individual outer and core layers may be prepared or preformed by conventional techniques, for example, the grass-like layer by continuous injection molding as disclosed in U.S. Pat. Nos. 3,507,010 and 3,590,109; the high density polyethylene backing layer via sheet extrusion; and the non-woven fabric via melt spinning. The adhesive composition is carefully applied to each side of the core layer by any suitable process such as extrusion coating so as to produce a film of copolymer adhesive on the fabric. Thereupon the layers may be brought into contact with each other in appropriate arrangement and subjected to elevated temperature and pressure via press rolls or like equipment. In this way the individual layers are caused to firmly adhere because of the presence of the copolymer adhesive layer on one side of the polyamide fabric between it and the high density polyethylene material and as well on the other side of the fabric between it and the low density polyethylene or polypropylene ply.

The preferred assembly process is to form the core layer, then coat each side of the core layer with the adhesive layer, then fusion-laminate the thus coated core layer to the grass-like layer as an integral step in the process of forming the grass-like layer according to U.S. Pat. No. 3,507,010 thereby forming a precursor of the grass-like layer fusion bonded on its planar rear surface to one adhesive layer and then finally fusion-bonding the other adhesive layer of such precursor to a high density polyethylene sheet being extruded at elevated temperature in accordance with the process described in U.S. Pat. No. 4,329,196.

The performance properties of the laminated spray-suppression devices of the invention can be determined via a bend-to-break test which measures the ability of the laminate to resist low temperature flexing, a low temperature impact resistance test and a peel strength test which measures the strength of bond between the functional grass-like layer and the adhesive layer to which it is joined which is important in that the layers must remain integral with each other as a unitary structure.

In the bend-to-break test a 24 inch (61 cms.) by 30 inch (76 cms.) section of laminated product and representing the size of a conventional truck rain flap is conditioned for twenty-four hours at −20° F. (minus 29° C.). The conditioned product is tightly clamped along a 24 inch (61 cms.) side between a pair of jaws of a device which includes a confining track into which the 30 inch (76 cms.) sides of the product are fitted which allows the product to be moved horizontally but not vertically. The jaws are then rotated angularly downwardly from the horizontal by means of a conventional drive mechanism through a maximum of 180 degrees at a rate of about fourteen degrees per second. This places the upper face of the product under test in tension and the lower face in compression. When cracking through the full thickness of the bending product occurs a clutch mechanism deactivates the drive mechanism and the traversed angle of rotation with the horizontal is read from an adjacent scale to provide the maximum angle through which the test specimen was capable of bending before breakage occurs at a temperature on the order of about −20° F. (minus 29° C.). Products according to the invention should achieve at least 90 degrees and typically do achieve 180 degrees in this test without fracturing through the full laminated structure even though on occasion with this test it is possible to hear the grass cracking yet such crack does not propagate through the high density polyethylene backing. Controls for this test comprising the grass-like low density polyethylene layer fusion-bonded directly to a high density polyethylene backing in U.S. Pat. No. 4,329,196 layer crack at an angle of about 30 to 35 degrees.

The test for low temperature impact resistance measures the energy in foot pounds required to crack test specimens under specified conditions of impact using a fixed weight, variable height falling tup. The technique used is commonly called the Bruceton Staircase Method and involves a combination of portions of ASTM D1709, part 36; D2444, part 26 and D3029, part 35. The procedure establishes the height which will cause 50 percent of the specimens tested to fail using a constant tup weight. According to the method the tup is repositioned after each impact to the next higher or lower increment depending upon the response from the previous specimen. Increments are ½ foot (15.24 cms.) units from ½ to 7½ feet (15.24 to 229 cms.) total. This will result ideally in half of the specimens passing and half failing. The average height at which this occurs when expressed as the product of the tup weight is termed the 50 percent pass/fail value. The impact resistance is the energy in foot pounds require to produce 50 percent failures and is determined for any given sample as the product of the mean drop height times the tup weight. Failure is signified by the presence of any crack or split created by the impact of the falling tup which can be seen by the naked eye. At least 20 specimens (5 by 5 inches (12.7 cms.) are taken from a 24 inch (61 cms.) by 30 inch (76 cms.) laminated product section. Specimens are conditioned at −20° F. (minus 29° C.) for at least 16 hours prior to testing. The test procedure involves presetting the tup to the estimated 50 percent pass/fail height, placing the specimen over the sample holder and releasing the tup to allow it to free fall to impact. If impact does not result in catastrophic failure, the specimen is closely examined for evidence of any crack or split. If the specimen passes the tup is reset to the next higher increment whereas if it fails the tup is reset at the next lower increment. If the tup is at maximum or minimum height its weight is adjusted as necessary to reestablish a practical working range. If weight adjustment cannot be made the specimen is recorded as pass or fail as applicable at the value obtained. Products according to the invention should achieve at least 50 foot pounds (6.9 kg. meters) and typically do achieve impact values of over 90 foot pounds (12.5 kg. meters) in this test whereas controls without the intervening layer made as set forth above in describing the bend-to-break test have values of about 10 foot pounds (1.4 kg. meters).

The test for peel strength is substantially in accordance with ASTM-D903-49, part 22. This test establishes the load per unit width of bond required to progressively separate the two major components of the laminated product at the interface of the adhesive layer i.e. the separation of the grass-like component from the backing layer by peeling such component away at approximately 180 degrees using a constant rate Instron testing machine at a separation rate of 2.5 inches per minute on strips one inch wide by ten inches long. Results are expressed in pounds per inch of width. Testing is done at 72° F. (22° C.) without prior conditioning. Ten specimens are taken per 24 inch (61 cms.) by 30 inch (76 cms.) section of laminated product and the value for the section is the average of the maximum values obtained. The unsecured end of the grass-like layer to be grasped by the jaws during testing is obtained during the process of laminating the grass-like layer to the adhesive layer (to be further described hereafter) by inserting a high melting point plastic film between the surfaces to be bonded prior to bonding. Such section including an adjacent bonded area will form the specimen to be tested. Products within the scope of the invention should have strong joints between layers as demonstrated by a peel strength of at least about 15 pounds per inch of width (2681 gms./cm.). Values of about 17 pounds per inch (3038 gms./cm.) of width are typically obtained.

The following specific examples are intended to illustrate more fully the nature of the present invention without acting as a limitation upon its scope. Percentages given are on a weight basis.

EXAMPLE 1

A spunbonded nylon 6,6 core layer of Cerex ® spunbonded nylon fabric at a nominal average basis weight of 1.5 ounces per square yard (35.7 gms./m$^2$) was extrusion coated on both sides in two passes with ethylene-vinyl acetate copolymer (Utratrathene ® UE635 from U.S. Industrial Chemicals Co.) comprising 91 percent ethylene and 9 percent vinyl acetate. The copolymer issued from a sheeting die into a nip formed by opposing laminating rolls consisting of pressure and chill rolls into which the nylon 6,6 web was also fed. The pressure roll was Teflon ® fluocarbonpolymer wrapped, neoprene covered and was not regulated at any specific temperature but the chill roll was maintained at about 40° F. (4° C.). The fabric thus coated on one side was accumulated on a windup roll whereupon it was passed through again under the same process conditions in a second pass to coat the opposite side. By controlling (i) the temperature of the copolymer at about 340 to 390° F. (171° to 199° C.), (ii) the extrusion and fabric speed rates at about 80 ft./min. (40.6 cms./sec.) for a 64 inch (162.6 cms.) wide strip a depth of penetration after passage through the roll nip of about 0.001 inch (0.025 mm) of the copolymer on each side into the initially 0.004 inch (0.10 mm.) thick fabric was obtained. Total thickness of the laminate on the windup roll was about 0.012 inch (0.3 mm.) consisting of 0.004 inch (0.10 mm.) of adhesive on each side of an unimpregnated 0.004 inch (0.10 mm.) core.

A grass-like layer of low density polyethylene (EM447 from Cities Service Company having a density of 0.915 and a melt index by ASTM-D1238-65T of 22) was formed according to the process of U.S. Pat. No. 3,507,010, FIGS. 1, 2 and 3. The coated core layer formed as above described was fusion-laminated directly to the rear substrate face of the grass-like layer as the latter was being formed and was still at elevated temperature. This was done by pressure loading a bonding roll at about 12 o'clock against molding roll 14 as shown in FIG. 1 of the '010 patent and feeding the coated core layer into the pressure nip between such rolls. Radiant heaters having a surface temperature of about 1000° F. (537.8° C.) were directed on the substrate of the grass-like layer at about two o'clock (FIG. 1 of the '010 patent) to melt the outer surface of such substrate for better fusion to the coated core layer. The coated core layer likewise may be heated via radiant heat just upstream of the bonding roll to promote the fusion-bonding.

The precursor consisting of the grass-like layer fusion-bonded on its planar substrate face to one adhesive layer enveloping the core layer was then secured to a high density polyethylene (CS315 from Cities Service Company having a melt index of 0.25 by ASTM-D1238 and a density of 0.956) substrate layer containing 1 percent carbon black and 0.1 percent (weight basis) of an antioxidant such as Irganox 1010, to form the final laminate product by fusion-bonding according to the process of copending application Ser. No. 067,205, filed Aug. 16, 1979, FIG. 1. The high density polyethylene was nominally at about 390° F. (198.9° C.) immediately beyond the extrusion die. The other rolls in such FIG. 1 had nominal temperatures as follows: 115° F. (46.1° C.)-roll 8; 205° F. (96.0° C.)-roll 9 and 90° F. (32.2° C.)-roll 15. Ambient air was used to cool the product beyond roll 15.

The finished laminated product tested according to the procedures previously described typically exhibited a bend-to-break angle of 180 degrees, an impact resistance of 75 foot pounds (10.4 kg. meters) and a peel strength of 17 pounds per inch (3036 gms. per cm.). The Vicat softening point of the UE635 is about 167° F. (75° C.). Consequently it is assumed that the peel strength value at 72° F. (22° C.) of 17 pounds per inch would be maintained at temperatures well below such softening point and that therefore 140° F. peel strength would be substantially equal to 72° F. peel strength.

EXAMPLE 2

This comparative Example demonstrates the importance of impregnating only a surface layer of the fabric core layer to positively affect low temperature performance of the final laminate product.

The process of Example 1 was repeated except that during extrusion coating of the nylon 6,6 core layer the temperature of the ethylene-vinyl acetate adhesive layer on exiting the die was increased to about 475° F. (246° C.) which resulted in the coating wetting the fabric core layer through its entire thickness. This was apparent as a result of the increased transparency of the coated product (the core layer per se being without coloring pigment) versus the partially impregnated condition of Example 1, wherein transparency was reduced in that the fibers acted as light diffusers. In addition, it was impossible to peel the adhesive layer from the fully impregnated core layer. The laminated product containing the core layer fully saturated with the ethylenevinyl acetate adhesive was tested according to the bend-to-break procedure used in Example 1 except that the apparatus was stopped at a bend of ninety degrees. Under such testing, bending failures at less than ninety degrees occurred on 30 percent of samples tested whereas without full wet-through of the core fabric no failures occurred at a 90 degree bend.

These results demonstrate the significance of maintaining fiber mobility of an unencapsulated portion of the thickness of the fabric core layer to inhibit low temperature crack propagation through the thickness of the laminated product of the invention.

In addition to temperature control, the thickness of thermoplastic adhesive layer on the core layer when applied by extrusion coating as previously described herein can also be affected by controlling the output of coating material from the extrusion die relative to the line speed of the fabric web. The condition of surface application with a small amount of penetration can be determined by inspecting the coated product. If the coating can be readily lifted from the fabric no bond has been obtained and such product is rejected. It is considered ideal if the adhesive layer can be peeled from the fabric layer and in so doing some of the fibers are separated and adhere to the adhesive. Also the force required to peel off the adhesive layer in this latter condition should be about four pounds per inch when measured according to the procedure used in Example 1. It is not considered acceptable if the product is approaching transparency and it is not possible to peel the adhesive layer from the fabric layer.

EXAMPLE 3

This comparative Example demonstrates the significance of the type of core layer used in the laminated product of the invention.

The process of Example 1 was repeated except that the core layer was a spunbonded polyester material available from DuPont Co. under the trademark Reemay. Weights of 1.0 and 1.35 ounces per square yard (23.7–31.9 gms./m$^2$) were used. The following property results were obtained on the laminated product:

TABLE I

| Reemay Weight (oz./yd.²) | Low Temperature Properties (−20° F.) | |
|---|---|---|
| | Avg. Bend-To-Break (degrees) | Impact (ft. lbs.) |
| 1.35 | 63 | 27 |
| 1.00 | 69 | 28 |

The above data shows that laminates containing spunbonded polyester as the core layer exhibit significantly inferior low temperature bend-to-break and impact properties in comparison with the 180 degrees and 75 foot pound (10.4 kg. meters) values obtained in Example 1 using the polyamide fabric core layer of the present invention.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A laminated spray-suppression device comprising a non-woven fabric core layer encapsulated on each side with an adhesive layer, a polymeric backing layer fusion-bonded to one of the adhesive layers and a polymeric grass-like, three-dimensional layer fusion-bonded to the other adhesive layer.

2. The device of claim 1 wherein the core layer comprises a polyamide.

3. The device of claim 1 wherein each adhesive layer comprises a thermoplastic adhesive.

4. The device of claim 3 wherein the thermoplastic adhesive comprises a copolymer of ethylene and at least one of vinyl acetate, methyl acrylate, ethyl acrylate, methyl ethyl acrylate or isobutyl acrylate.

5. The device of claim 4 wherein the thermoplastic adhesive copolymer is at least 70 weight percent ethylene.

6. The device of claim 5 wherein the grass-like layer comprises low density polyethylene.

7. A method of minimizing the tendency of a spray-suppression laminate which includes a polymeric grass-like layer and a polymeric backing layer to crack through its thickness on the application of stress at low temperature, said method comprising the step of incorporating a core layer into the laminate between said backing layer and said grass-like layer for inhibiting crack-propagation from the grass-like layer to the backing layer, said core layer comprising a non-woven fabric encapsulated on each side with a thermoplastic adhesive layer melt bondable to said backing layer and said grass-like layer.

8. The process of claim 7 including the step of absorbing the thermoplastic adhesive into a predetermined portion of the thickness of the core layer before said incorporating step.

9. The process of claim 8 wherein the adhesive comprises a copolymer of ethylene and one of vinyl acetate, methyl acrylate, ethyl acrylate, methyl ethyl acrylate or isobutyl acrylate.

* * * * *